Nov. 8, 1932.　　　A. R. TALLMAN　　　1,887,469
DIRECTION INDICATOR
Filed Sept. 26, 1930　　2 Sheets-Sheet 1
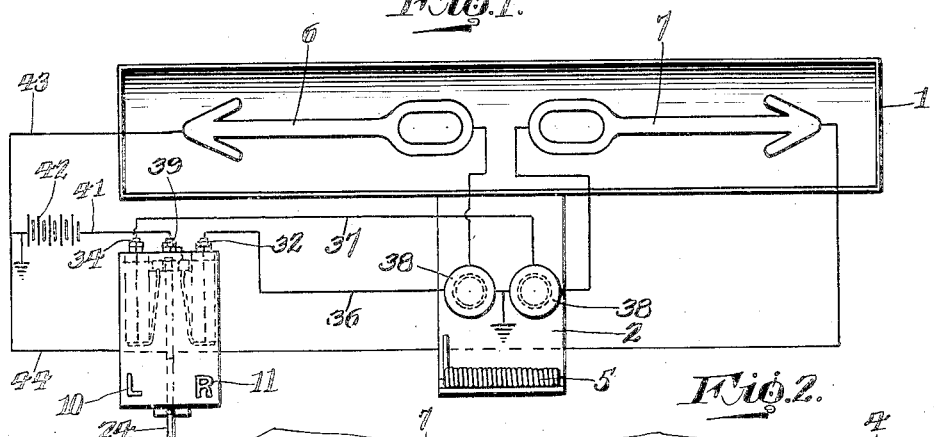
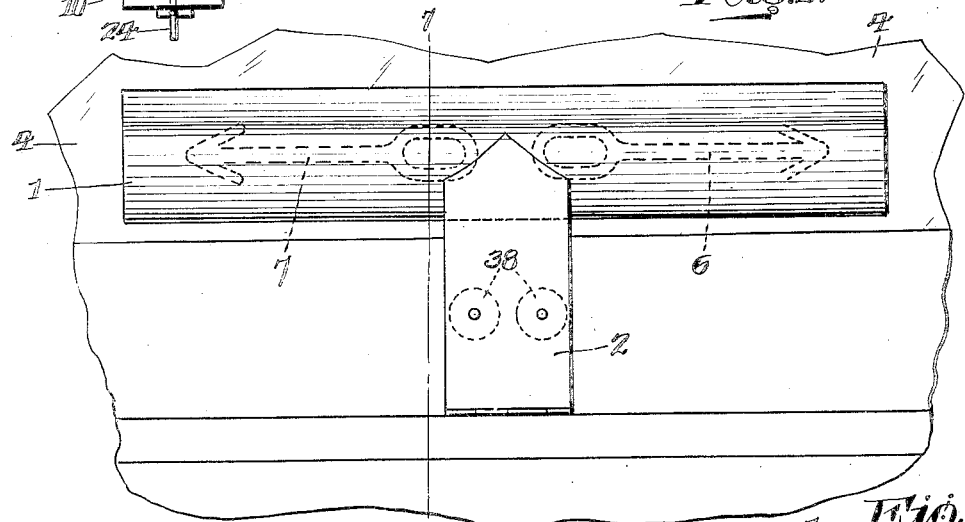
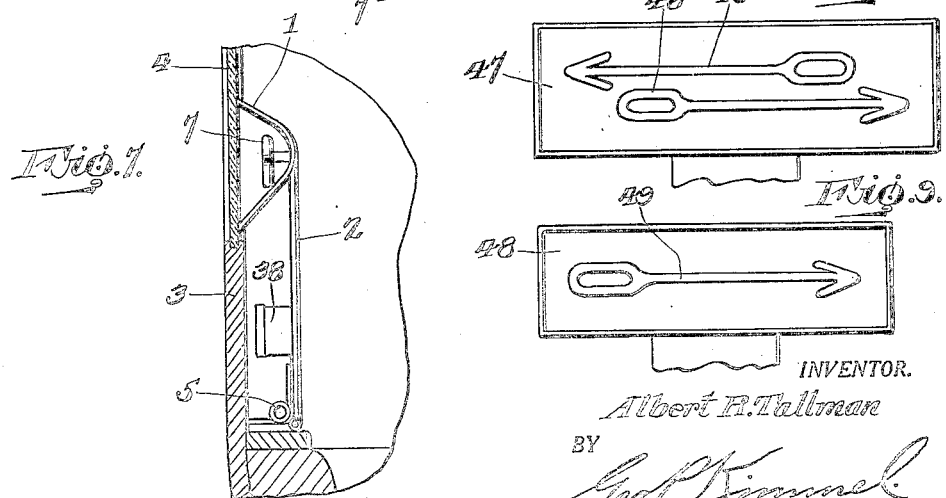
INVENTOR.
Albert R. Tallman
BY
Geo. S. Kimmel
ATTORNEY.

Nov. 8, 1932.  A. R. TALLMAN  1,887,469

DIRECTION INDICATOR

Filed Sept. 26, 1930  2 Sheets-Sheet 2

INVENTOR.
Albert R. Tallman
BY
Geo. Kimmel
ATTORNEY.

Patented Nov. 8, 1932

1,887,469

UNITED STATES PATENT OFFICE

ALBERT ROMAINE TALLMAN, OF NASHVILLE, TENNESSEE, ASSIGNOR OF ONE-HALF TO JAMES W. WARNER, JR., OF NASHVILLE, TENNESSEE

DIRECTION INDICATOR

Application filed September 26, 1930. Serial No. 484,650.

This invention relates to a direction indicator particularly adapted for use in connection with motor vehicles, and has for its primary object to provide, in a manner as hereinafter set forth, a device by means of which a contemplated change of direction of a vehicle may be indicated to pedestrians and to the operators of other vehicles.

A further object of the invention is to provide a direction indicator of the character aforesaid which includes a switch manually operable to close a circuit for indicating a contemplated change of direction, and automatically operable to open the circuit after the change of direction has been indicated.

A further object of the invention is to provide a direction indicator including a switch as aforesaid wherein the switch is thermostatically controlled to provide for the operation thereof to open the circuit when desired.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is a diagrammatic view showing the signal indicating members in rear elevation and further showing the circuits for operating the same.

Figure 2 is a fragmentary elevation of the interior of a vehicle body showing the casing for the signal indicating members.

Figure 7 is a section taken on the line 7—7 of Figure 2.

Figure 8 is an elevation of a signal casing showing a modified arrangement of signal indicators therein.

Figure 9 is an elevation of a signal casing equipped with a single signal indicator.

Figure 3:
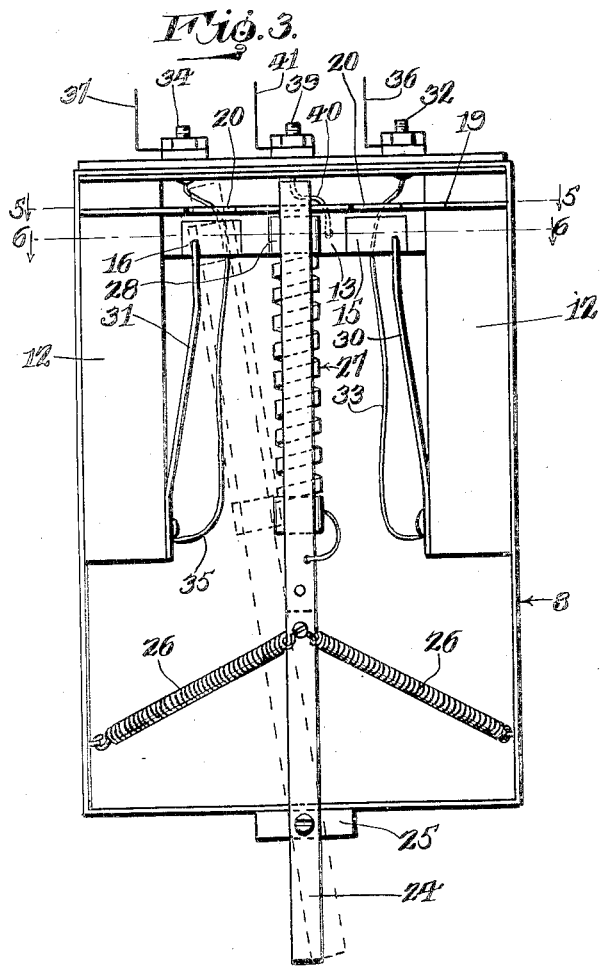
Figure 3 is an elevation of the switch box with the rear wall removed.
Figure 4:
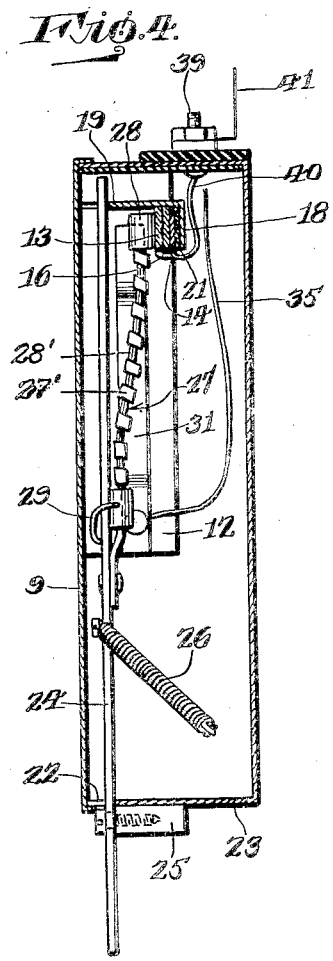
Figure 4 is a central vertical section through the switch box.
Figure 5:
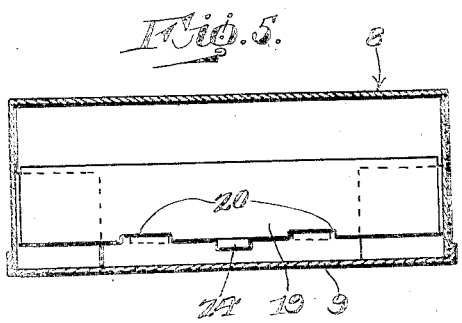
Figure 5 is a transverse section therethrough taken at a point indicated by the line 5—5 of Figure 3.
Figure 6:
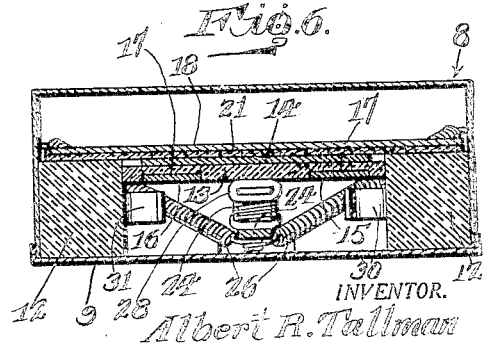
Figure 6 is a transverse section therethrough taken at a point indicated by the line 6—6 of Figure 3.

Referring to the drawings in detail, the numeral 1 indicates a signal casing supported on a hinged bracket 2 adapted to be mounted within a vehicle body 3 in a manner to bring the casing 1 in alignment with the rear window 4 of the vehicle body. The casing 1 has an open rear face which is maintained in contact with the window 4 by means of a spring 5 secured to the bracket 2 on opposite sides of the hinge therefor. Disposed within the casing 1 are a pair of oppositely disposed signal indicators 6 and 7 of the neon sign type which may be illuminated by the passage of an electric current therethrough.

Pivotally mounted with respect to the operator of the vehicle is a switch box 8 having a removable rear wall 9 provided on its outer face with direction indicating indicia 10 and 11. Disposed within the box 8 are a pair of spaced posts 12 formed of insulating material. Secured to the posts 12 and extending therebetween is a plate 13 of insulating material, to the forward face of which is secured a conductor plate 14 having a pair of spaced fingers 15 and 16 upturned from the lower face thereof and seated within recesses 17 in the rear face of the plate 13. Secured to the posts 12 and extending across the forward faces thereof is a plate 18 formed at its upper edge with a horizontal extension 19 which terminates in spaced relation to the rear wall of the box. The extension 19 is provided in its rear edge face with a pair of spaced notches 20 for a purpose to be hereinafter referred to. The plate 18 is provided with a lining 21 which insulates the same from the conductor plate 14.

Extending through a slot 22 in the bottom wall 23 of the box 8 is a lever 24 which is pivotally connected to a block 25 secured to the lower wall 23. The lever 24 extends upwardly beyond the extension 19 and is maintained in contact therewith by means of a pair of oppositely disposed springs 26 which extend outwardly and forwardly from the lever and are secured to the box 8. Carried by the lever 24 is a thermostat 27 which is rigidly secured at its lower end to the lever, and which is provided at its upper end with a contact member 28 normally seated against the insulating plate 13. The thermostat 27 is grounded to the lever 24 by means of a conductor 29.

Secured to the posts 12 are a pair of resilient contact plates 30 and 31 which terminate with free upper edges adjacent the fingers 15 and 16 respectively. Leading from the plate 30 to a terminal 32 mounted on the box 8 is a conductor 33. Leading from the plate 31 to a similar terminal 34 mounted on the box 8 is a conductor 35. Leading from the terminals 32 and 34 to the signal indicators 6 and 7 are a pair of conductors 36 and 37 respectively, each of which is provided with a step-up transformer 38 suitably mounted on the bracket 2. Mounted on the box 8 is a terminal 39 having a conductor 40 leading to the conductor plate 14. Connected with the terminal 39 is a conductor 41 which is also connected with a source of electrical energy, such as a battery 42. Leading to the battery 42 from the signal indicators 6 and 7 respectively are a pair of conductors 43 and 44 respectively. The thermostat as shown consists of the usual bimetallic element 28' suitably insulated from the contact 28, and a heating coil 27', encircling the element 28'.

When it is desired to indicate a contemplated change of direction, the lower end of the lever 24 is moved to the left or right in order to bring the contact 28 into engagement with one of the fingers 15 and 16 and one of the conductor plates 30 and 31. For example, if it is desired to indicate a left turn, the lower end of the lever 24 is moved toward the signal indicating indicia 10, by means of which the upper end of the lever 24 is moved to the right until the lever drops within the notch 20 adjacent the finger 15 and plate 30, the lever being yieldingly held in such notch by the action of the springs 26. Upon the entrance of the lever 24 into this notch, the contact 28 is brought into engagement with the finger 15 and plate 30 whereby the normally open circuit therebetween is closed to provide for the passage of current through the signal indicator 6 to illuminate the same. Upon the engagement of the contact member 28 with the finger 15, current is passed through the coil 27' whereby the element 28' is heated and operates to force the lever 24 out of the notch in the extension 19, after which the lever is drawn to a vertical position by the action of the springs 26, in which position the contact 28 is out of engagement with the finger 15 and plate 30, breaking the electrical connection therebetween. Preferably the thermostat 27 will be regulated so as to require approximately ten seconds for the same to move the lever 24 out of the notch 20, thereby automatically rendering the signal indicator 6 inactive after the same has been active for approximately ten seconds. When the element 28' becomes heated, the free upper end thereof is prevented from moving away from the lever 24, due to the engagement of the contact 28 with the finger 15, therefore the pressure of the element 28' is transmitted through its lower end to the lever 24 whereby the upper end of the latter is moved away from the element 28' to disengage the lever from the notch 20.

If it is desired to signal a right turn, the lower end of the lever 24 is pushed towards the signal indicating indicia 11, by means of which the lever 24 is moved into the notch 20 adjacent the finger 16 and plate 31, in which position the contact member 28 is in engagement with the finger 16 and plate 31 to close the normally open circuit therebetween to provide for the illumination of the signal indicator 7. After a predetermined period the lever 24 will be returned to its neutral position by the action of the thermostat 27 and springs 26 as heretofore described.

It is to be understood that the arrangement of the casing 1 and the signal indicators therein is optional, and that such arrangement is susceptible of any change desired. In Figure 8 there is shown a modified arrangement wherein the signal indicators 45 and 46 are arranged in superposed relation within the casing 47. If desired, a separate casing may be provided for each indicator such as the casing 48 having the right turn indicator 49 disposed therein as illustrated in Figure 9.

It is thought that the many advantages of a direction indicator in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In a switch for selectively closing a plurality of normally open circuits, each having a pair of spaced contacts, a pivoted circuit closing element manually movable to selective positions to engage the spaced contacts of a selected circuit, a latch plate having a notch adjacent the spaced contacts of each circuit, and spring means for drawing the circuit closing element into engagement with a selected notch upon the engagement of the element with the spaced contacts adjacent to the selected notch, said circuit closing element including means for automatically moving the same out of engagement with the notch after a predetermined period, said spring means operating to move the circuit closing element to circuit opening position upon the release of the element from the notch.

2. In a switch for closing a normally open circuit having a pair of spaced contacts, a pivoted circuit closing element manually movable into a position to engage said contacts to close the circuit, a latch plate having a notch adjacent said contacts, and spring means for drawing the circuit closing element into engagement with said notch upon the engagement of the element with the contacts, said circuit closing element including means for automatically moving the same out of engagement with the notch after a predetermined period, said spring means operating to move the circuit closing element to circuit opening position upon the release of the element from the notch.

3. In a switch for closing a normally open circuit having a pair of spaced contacts, a pivoted lever, a thermal element carried by the lever and having a contact member for connecting said spaced contacts when brought into engagement therewith, tension means acting on the lever for normally maintaining said contact member out of engagement with said spaced contacts, said lever being manually movable into a position to engage said contact member with said spaced contacts to close the circuit, and a latch plate having a notch for engagement with said lever when the circuit is closed, said thermal element operating after a predetermined period to release the lever from the notch.

4. In a switch for selectively closing a plurality of normally open circuits, each having a pair of spaced contacts, a pivoted lever, a thermal element carried by the lever and having a contact member for connecting the spaced contacts of a circuit when brought into engagement therewith, a pair of oppositely disposed springs connected to the lever for normally maintaining said contact member out of engagement with the spaced contacts of the circuits, said lever being manually movable to engage the contact member with the spaced contacts of the circuits selectively, and latching means adjacent the spaced contacts of each circuit for engagement with the lever when the contact member is in engagement with the spaced contacts of the circuit adjacent the latching means, said springs operating to releasably hold the lever in engagement with the latching means adjacent a closed circuit, said thermal element operating after a predetermined period to release the lever from the latching means engaging the same.

5. In a switch for selectively closing a plurality of normally open circuits, each having a pair of spaced contacts, a pivoted lever, a thermal element carried by the lever and having a contact member for connecting the spaced contacts of a circuit when brought into engagement therewith, tension means for normally maintaining said contact member out of contact with the spaced contacts of the circuits, said lever being manually movable to engage the contact member with the spaced contacts of the circuits selectively, and latching means for engagement with the lever when the contact member is in engagement with the spaced contacts of a circuit, said thermal element operating after a predetermined period to release the lever from the latching means.

In testimony whereof, I affix my signature hereto.

ALBERT ROMAINE TALLMAN.